United States Patent
P. et al.

(10) Patent No.: US 12,351,019 B1
(45) Date of Patent: Jul. 8, 2025

(54) RETAINER FOR POWER TAKE-OFF ASSEMBLY

(71) Applicant: Caterpillar Inc., Peoria, IL (US)

(72) Inventors: Muthu Karuppiah P., Chennai (IN); Cristian Veja, Dunlap, IL (US); Vishnu Venkateswar B., Chennai (IN); Jay Carl Landsiedel, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/762,903

(22) Filed: Jul. 3, 2024

(51) Int. Cl.
  *B60K 17/28* (2006.01)
  *F16F 15/315* (2006.01)

(52) U.S. Cl.
  CPC ............ *B60K 17/28* (2013.01); *F16F 15/315* (2013.01)

(58) Field of Classification Search
  CPC .............................. B60K 17/28; F16F 15/315
  See application file for complete search history.

(56) References Cited

U.S. PATENT DOCUMENTS

| | | | | |
|---|---|---|---|---|
| 1,441,595 | A * | 1/1923 | Miller | B60K 17/28 |
| | | | | 212/172 |
| 2,918,826 | A * | 12/1959 | Carl | F15B 11/02 |
| | | | | 74/411 |
| 4,321,896 | A * | 3/1982 | Kasting | F02B 67/04 |
| | | | | 123/195 A |
| 5,540,112 | A * | 7/1996 | Baker | F16H 57/12 |
| | | | | 74/397 |
| 5,645,363 | A * | 7/1997 | Dafforn | B60K 17/28 |
| | | | | 403/3 |
| 6,224,289 | B1 * | 5/2001 | Redd | B60K 25/06 |
| | | | | 403/337 |
| 6,371,743 | B1 * | 4/2002 | Richards | F01C 1/077 |
| | | | | 418/36 |
| 7,047,929 | B2 * | 5/2006 | Aketa | F01B 1/12 |
| | | | | 123/195 R |
| 7,658,124 | B2 * | 2/2010 | Brosowske | F16H 55/14 |
| | | | | 74/411 |
| 7,798,027 | B2 * | 9/2010 | Paul | H02K 7/116 |
| | | | | 475/343 |
| 8,695,455 | B2 * | 4/2014 | Petry-Johnson | F16D 1/076 |
| | | | | 123/90.31 |

(Continued)

FOREIGN PATENT DOCUMENTS

| | | |
|---|---|---|
| CN | 101813177 | 5/2014 |
| DE | 102016119361 | 4/2017 |
| JP | 2003083079 | 3/2003 |

*Primary Examiner* — Laura Freedman

(57) ABSTRACT

A retainer for a power take-off assembly includes a flange and a body defining a first end surface, a second end surface, and a first through-hole. The body includes a pilot feature extending at least partially through the body and radially offset from a central axis. A first portion of the pilot feature extends axially outwards from the second end surface. The pilot feature defines a second through-hole. The retainer also includes a dowel coupled with the body and at least partially disposed in the first through-hole. A second portion of the dowel extends axially outwards from the second end surface of the body. The dowel defines a third through-hole that is in alignment with the first through-hole of the body. The retainer allows removable coupling of a flywheel housing of the power take-off assembly with a plurality of gears associated with the power take-off assembly.

20 Claims, 8 Drawing Sheets

(56) References Cited

U.S. PATENT DOCUMENTS

| | | | |
|---|---|---|---|
| 8,800,517 B2 | 8/2014 | Petry-Johnson et al. | |
| 9,357,690 B2 * | 6/2016 | Huegerich | B60K 17/28 |
| 9,752,624 B2 * | 9/2017 | Huegerich | F16D 1/10 |
| 9,975,424 B2 * | 5/2018 | Krapf | F16H 57/031 |
| 9,994,102 B2 * | 6/2018 | Simon | B60K 25/06 |
| 10,843,558 B2 * | 11/2020 | Burrell | B60K 17/28 |
| 11,472,288 B2 * | 10/2022 | Putz | B60K 17/28 |
| 11,946,514 B2 * | 4/2024 | Ducher | F16D 25/123 |
| 12,135,075 B2 * | 11/2024 | Tsuchida | F16H 37/022 |
| 2023/0219354 A1 * | 7/2023 | Higashi | B41J 17/32 |
| | | | 347/214 |
| 2023/0304574 A1 | 9/2023 | Adriaansen | |

* cited by examiner

RETAINER FOR POWER TAKE-OFF ASSEMBLY

TECHNICAL FIELD

The present disclosure relates to a power take-off assembly, a retainer for the power take-off assembly, and a method of assembling the power take-off assembly.

BACKGROUND

A power take-off (PTO) assembly is typically used for transmitting power from an engine of a work machine to an auxiliary equipment of the work machine. The power take-off assembly includes a number of gears having different number of teeth to achieve different gear ratios depending on application requirements. The power take-off assembly typically includes a number of components, each of which is designed to provide a specific gear ratio. This may increase a complexity of the power take-off assembly as well as manufacturing and inventory costs associated with the power take-off assembly. Further, a housing for example, a flywheel housing, accommodates the number of gears. In some examples, different design of the housing and other coupling components may be required to accommodate different gears, which may increase an overall cost as well part numbers of the power take-off assembly.

The power take-off assembly includes one or more fasteners to couple individual gears with the housing. Since, each gear ratio may have different amount of loading, the fasteners may fail due to gear load. Further, to achieve different gear ratios, the power take-off assembly may require multiple fasteners to couple the individual gear with the housing, that may increase a size of the gears. However, the increase in size of the gears may not be feasible due to cost as well as space constraints.

Further, to ensure longevity and efficient operation of the power take-off assembly, adequate lubrication is required. The provision of lubrication oil typically requires drilling of lubrication pathways in gear housings. Moreover, a number of lubrication pathways may increase when multiple fastener locations are required. Such lubrication pathways may increase manufacturing costs and design complexity of the power take-off assembly.

U.S. Pat. No. 8,800,517 describes an engine that includes a camshaft supported in a housing for rotation about an axis of rotation. A cam gear is attached to one end of the camshaft and includes a first thrust bearing surface. A thrust ring is attached to the cam gear and includes a second thrust bearing surface. A thrust ring retainer is attached to the housing with a plurality of bolts and includes a pair of thrust surfaces trapped between the first thrust bearing surface of the cam gear and a second thrust bearing surface of the thrust ring. The thrust ring retainer also defines a portion of a lubrication connection passage that facilitates pressure equalization among a plurality of lubrication galleries arranged in parallel adjacent the camshaft.

SUMMARY OF THE DISCLOSURE

In an aspect of the present disclosure, a retainer for a power take-off assembly is provided. The retainer includes a flange. The retainer also includes a body axially extending from the flange along a central axis of the retainer. The body defines a first end surface fixedly coupled with the flange, a second end surface opposite the first end surface, and a first through-hole extending at least partially through the body and radially offset from the central axis of the retainer. The body includes a pilot feature extending at least partially through the body and radially offset from the central axis of the retainer. A first portion of the pilot feature extends axially outwards from the second end surface of the body. The pilot feature defines a second through-hole. The retainer further includes a dowel coupled with the body. The dowel is at least partially disposed in the first through-hole. A second portion of the dowel extends axially outwards from the second end surface of the body. The dowel defines a third through-hole that is in alignment with the first through-hole of the body. The retainer allows removable coupling of a flywheel housing of the power take-off assembly with a plurality of gears associated with the power take-off assembly. The plurality of gears have different number of teeth to achieve different gear ratios.

In another aspect of the present disclosure, a power take-off assembly is provided. The power take-off assembly includes a flywheel housing. The power take-off assembly also includes a retainer adapted to be removable coupled with the flywheel housing. The retainer includes a flange. The retainer also includes a body axially extending from the flange along a central axis of the retainer. The body defines a first end surface fixedly coupled with the flange, a second end surface opposite the first end surface, and a first through-hole extending at least partially through the body and radially offset from the central axis of the retainer. The body includes a pilot feature extending at least partially through the body and radially offset from the central axis of the retainer. A first portion of the pilot feature extends axially outwards from the second end surface of the body. The pilot feature defines a second through-hole. The retainer further includes a dowel coupled with the body. The dowel is at least partially disposed in the first through-hole. A second portion of the dowel extends axially outwards from the second end surface of the body. The dowel defines a third through-hole that is in alignment with the first through-hole of the body. The power take-off assembly further includes a gear removably coupled with the flywheel housing via the retainer. The power take-off assembly includes a first fastener receivable within the first through-hole of the body and the third through-hole of the dowel to removably couple the retainer with the flywheel housing. The power take-off assembly also includes a second fastener receivable within the second through-hole of the pilot feature to removably couple the retainer with the flywheel housing.

In yet another aspect of the present disclosure, a method of assembling a power take-off assembly is provided. The method includes providing a retainer of the power take-off assembly. The retainer includes a flange. The retainer also includes a body axially extending from the flange along a central axis of the retainer. The body defines a first end surface fixedly coupled with the flange, a second end surface opposite the first end surface, and a first through-hole extending at least partially through the body and radially offset from the central axis of the retainer. The body includes a pilot feature extending at least partially through the body and radially offset from the central axis of the retainer. A first portion of the pilot feature extends axially outwards from the second end surface of the body. The pilot feature defines a second through-hole. The retainer further includes a dowel coupled with the body. The dowel is at least partially disposed in the first through-hole. A second portion of the dowel extends axially outwards from the second end surface of the body. The dowel defines a third through-hole that is in alignment with the first through-hole of the body. The method also includes providing a flywheel housing of the power take-off assembly. The method further includes mounting, on the body of the retainer, at least one of a plurality of gears based on a required gear ratio of the power take-off assembly. The plurality of gears have different number of teeth. The method includes aligning the retainer with the flywheel housing. The method also includes coupling, via a first fastener and a second fastener, the retainer with the flywheel housing to removably couple at least one of the plurality of gears with the flywheel housing.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
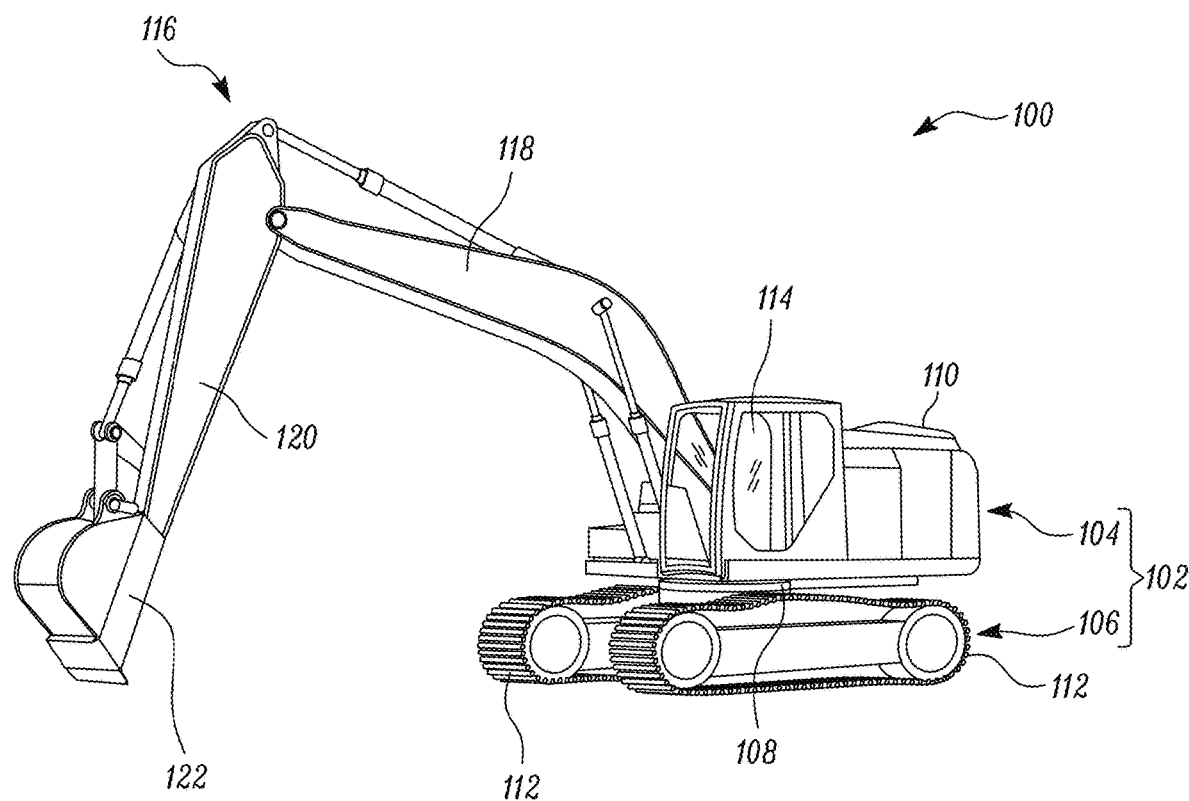
FIG. 1 is a schematic side view of an exemplary work machine, according to an example of the present disclosure.

Referring to FIG. 1, a perspective view of an exemplary work machine 100 is illustrated. The work machine 100 may perform one or more work operations associated with an industry, such as mining, construction, farming, transportation, or any other industry known in the art. The work machine 100 is embodied as an excavator that may be used for purposes, such as digging, construction, landscaping, and the like. Alternatively, the work machine 100 may be embodied as a grader, a dozer, a loader, a scraper, a milling machine, a paving machine, a tractor, a mining truck, and a compactor, etc. that may be used in various industries to move, remove, or load materials, such as, asphalt, debris, dirt, snow, feed, gravel, logs, raw minerals, recycled material, rock, sand, woodchips, and the like.

The work machine 100 includes a body 102. The body 102 includes an upper structure 104 and a lower structure 106. The upper structure 104 is rotatably mounted on the lower structure 106 via a swing bearing portion 108 therebetween. The upper structure 104 includes a hood 110. The work machine 100 also includes a power source (not shown) disposed within the hood 110. The power source may include an engine, such as, an internal combustion engine, a battery system, fuel cells, and the like. The power source may provide power to various components of the work machine 100 for operational and mobility requirements. The work machine 100 further includes a pair of tracks 112. The pair of tracks 112 are supported by the lower structure 106 and provide support and mobility to the work machine 100 on grounds. Alternatively, the work machine 100 may include wheels/drums instead of the tracks 112.

The upper structure 104 further includes an operator cabin 114. The operator cabin 114 may include one or more controls (not shown) that may enable an operator to control the work machine 100.

The work machine 100 includes a linkage assembly 116. The linkage assembly 116 is movably coupled to the upper structure 104. The linkage assembly 116 includes a boom 118 and an arm 120. The linkage assembly 116 also includes a work tool 122 pivotally coupled to the arm 120. The work tool 122 may be used to perform work operations, such as, loading, stock piling, dumping, digging and the like. The work tool 122 is embodied as a bucket herein. Alternatively, the work tool 122 may be any other type of work tool known in the art, such as, a blade.

Figure 2:
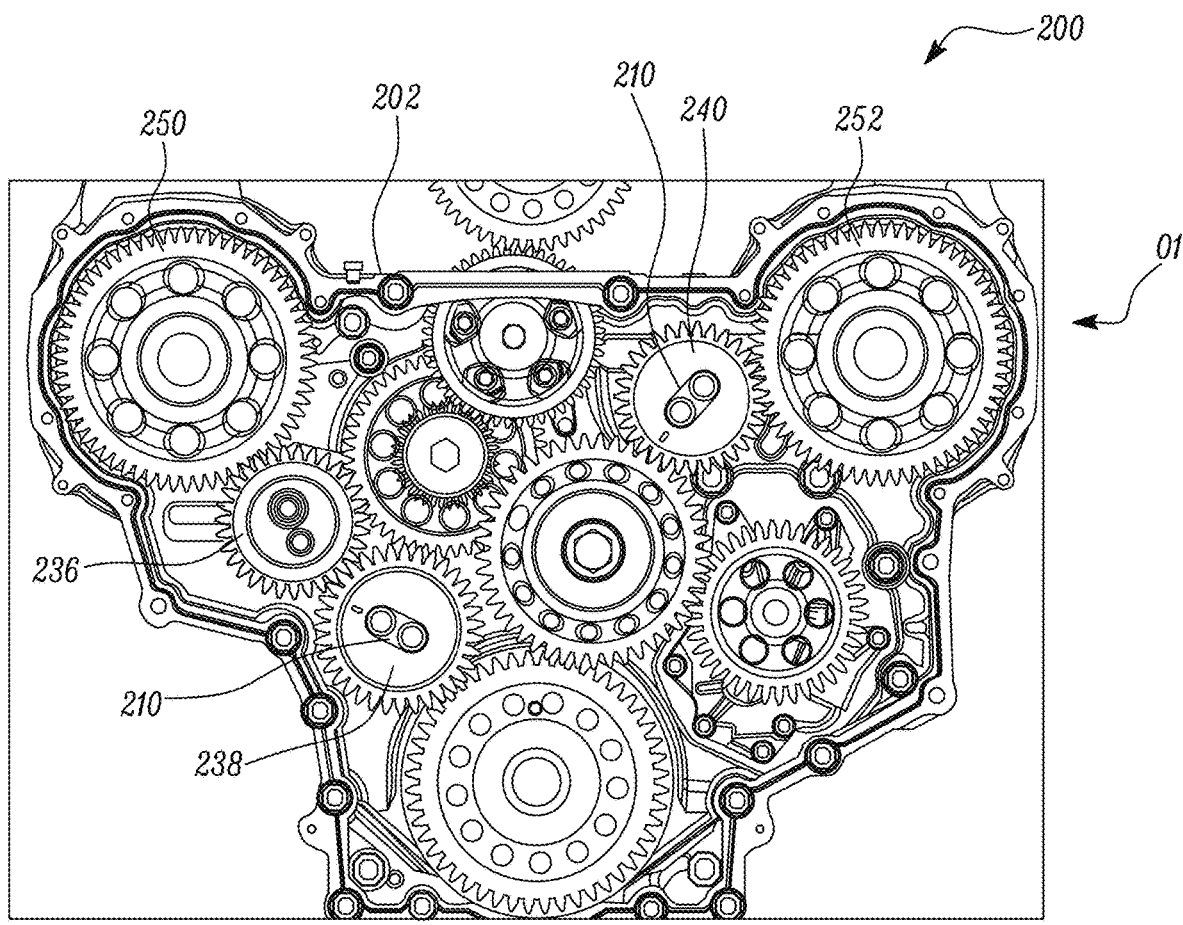
FIG. 2 is a schematic front view of a power take-off assembly, according to an example of the present disclosure.

The work machine 100 further includes a power take-off assembly 200 (shown in FIG. 2). The power take-off assembly 200 may be embodied as a rear power take-off assembly 200. The power take-off assembly 200 transfers power from the power source to one or more components of the work machine 100, for example, pumps, such as, hydraulic pumps, traction motors, and the like.

Referring to FIG. 2, a schematic front view of the power take-off assembly 200 is illustrated. Only some components of the power take-off assembly 200 are shown in FIG. 2. The power take-off assembly 200 includes a flywheel housing 202. The power take-off assembly 200 also includes a number of gears 236, 238, 240. The gears 236, 238, 240 are embodied as idler gears herein. The number of gears 236, 238, 240 have different number of teeth to achieve different gear ratios. Specifically, in the illustrated example of FIG. 2, the gear 236 has 31 teeth, the gear 238 has 35 teeth, and the gear 240 has 31 teeth. The number of teeth associated with the gears 236, 238, 240 depends on a required gear ratio of the power take-off assembly 200. In the illustrated example of FIG. 2, the power take-off assembly 200 provides 1:1 gear ratio. The power take-off assembly 200 further includes gears 250, 252. The gear 250 includes a number of teeth that are in engagement with the teeth of the gear 236 such that, based on a rotational movement of the gear 236, the gear 236 transfers rotational movement to the gear 250. The gear 252 includes a number of teeth that are in engagement with the teeth of the gear 240 such that, based on a rotational movement of the gear 240, the gear 240 transfers rotational movement to the gear 252.

The power take-off assembly 200 further includes a retainer 210 removably coupled with the flywheel housing 202. Specifically, in the illustrated example of FIG. 2, the power take-off assembly 200 includes three retainers 210, each of which is associated with a corresponding gear 236, 238, 240.

Figure 3:
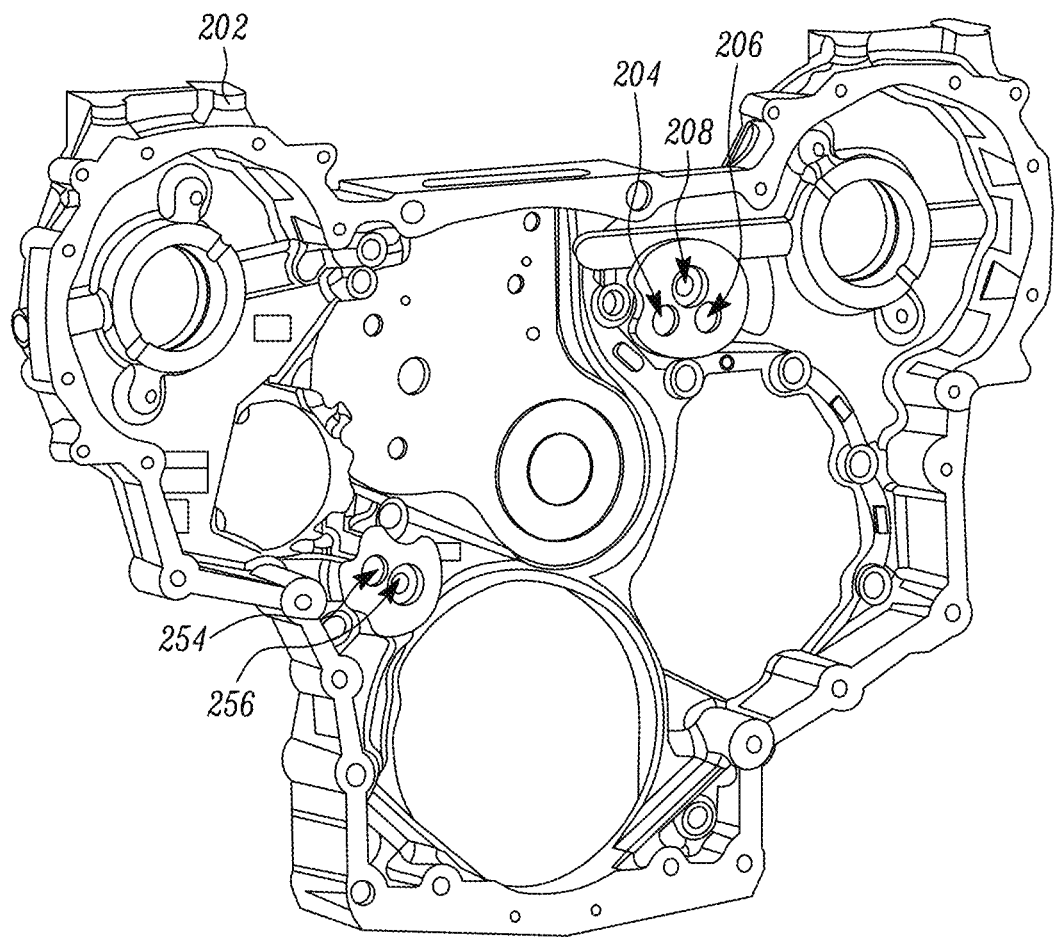
FIG. 3 is a schematic perspective view of a flywheel housing of the power take-off assembly of FIG. 2, according to an example of the present disclosure.

FIG. 3 is a schematic perspective view of the flywheel housing 202 of the power take-off assembly 200 of FIG. 2. The flywheel housing 202 defines a first opening 204, a second opening 206, and a third opening 208. The flywheel housing 202 further defines a fourth opening 254 and a fifth opening 256. The first and second openings 204, 206 are blind openings. Further, the third opening 208 is a through-opening.

Figure 4:
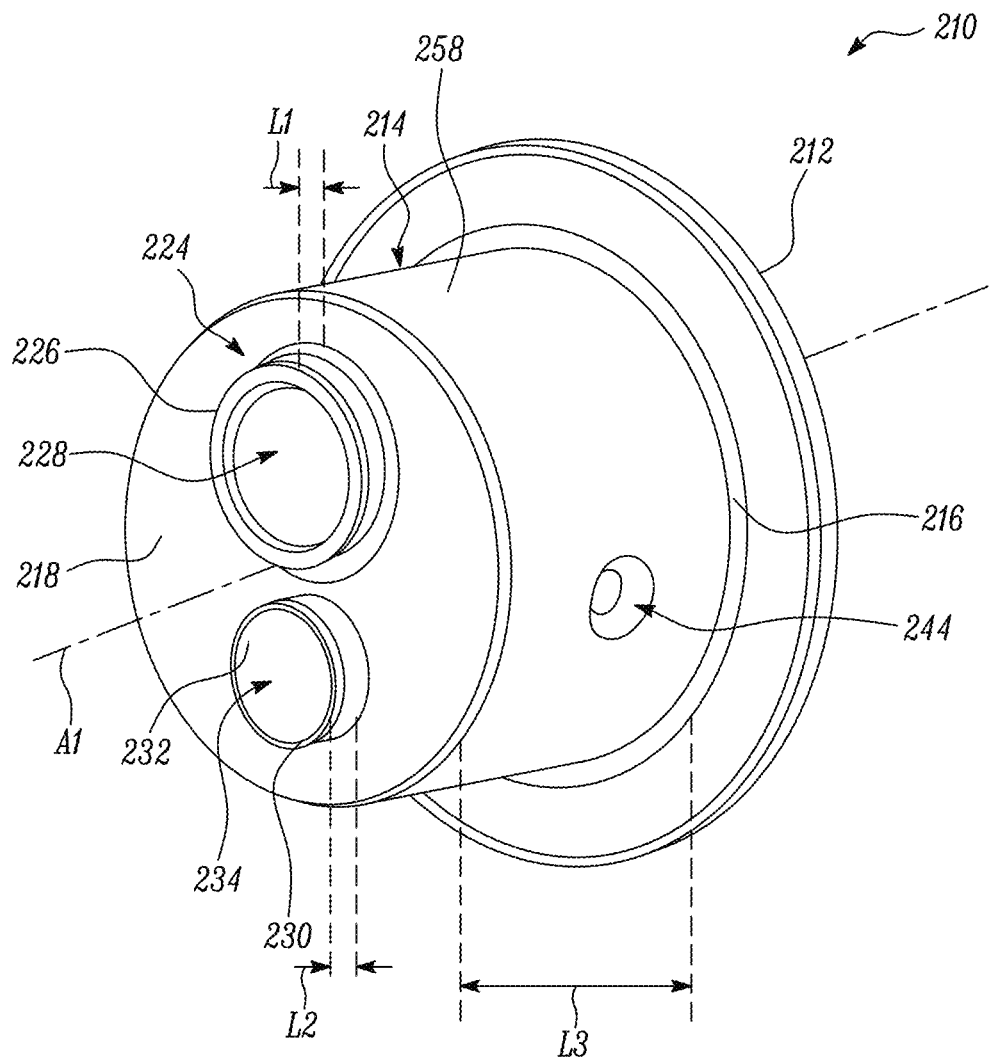
FIGS. 4 and 5 are different schematic perspective views of a retainer for the power take-off assembly of FIG. 2, according to an example of the present disclosure.
Figure 5:
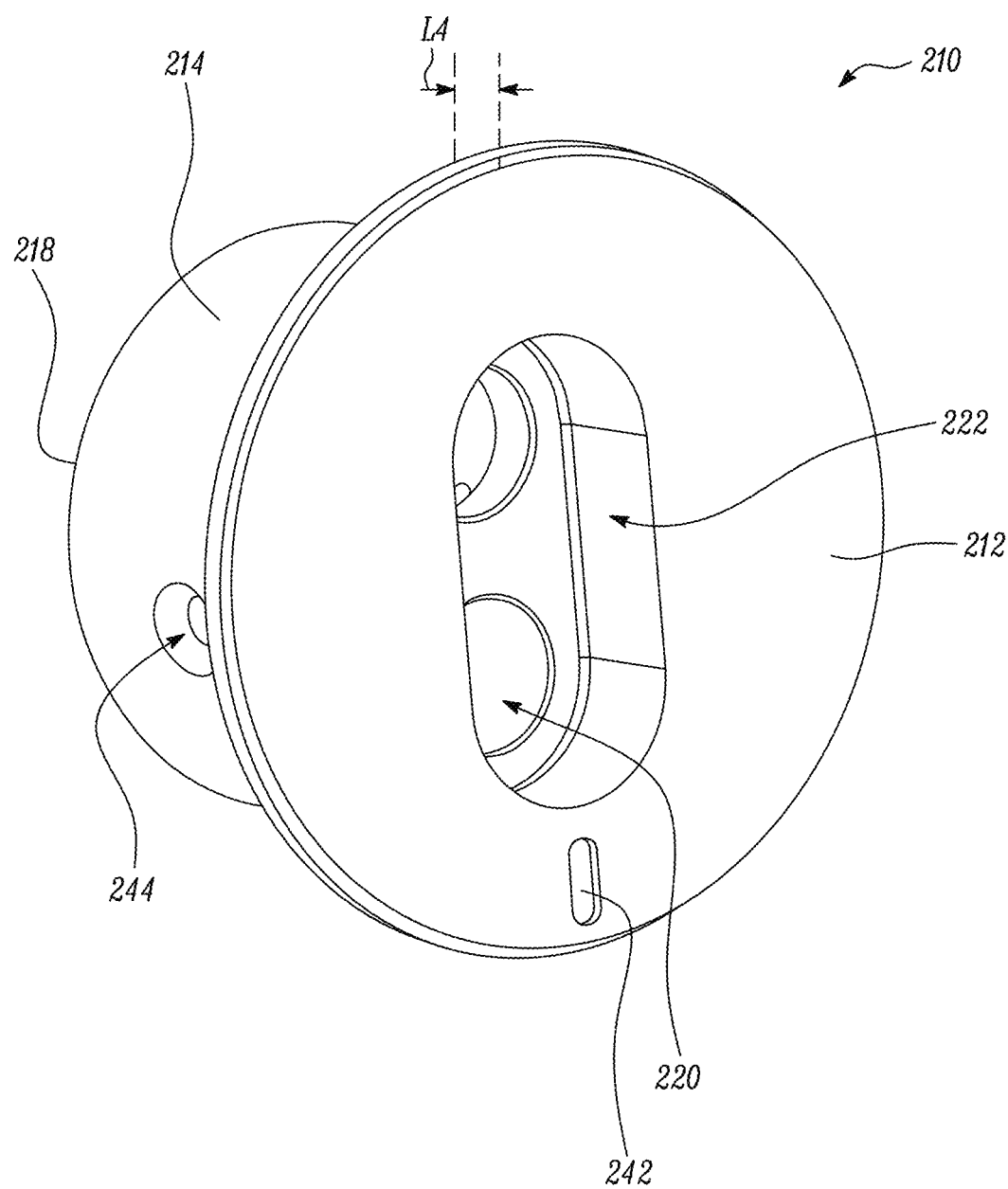

Referring to FIGS. 4 and 5, different schematic perspective views of the retainer 210 for the power take-off assembly 200 of FIG. 2 are illustrated. The retainer 210 includes a flange 212. The flange 212 includes an identification mark 242. The identification mark 242 provides a visual indication to indicate whether the retainer 210 is disposed in a desired orientation relative to the flywheel housing 202.

The retainer 210 also includes a body 214 axially extending from the flange 212 along a central axis A1 of the retainer 210. A length L3 of the body 214 is substantially greater than a length L4 of the flange 212 along the central axis A1. The body 214 defines a first end surface 216 fixedly coupled with the flange 212, a second end surface 218 opposite the first end surface 216, and a first through-hole 220 extending at least partially through the body 214 and radially offset from the central axis A1 of the retainer 210. The body 214 defines an outer surface 258. The gears 236, 238, 240 (see FIG. 2) are disposed on the outer surface 258 of the corresponding retainer 210.

The body 214 includes a pilot feature 224 extending at least partially through the body 214 and radially offset from the central axis A1 of the retainer 210. The pilot feature 224 includes a first portion 226. The first portion 226 of the pilot feature 224 extends axially outwards from the second end surface 218 of the body 214. The first portion 226 defines a length L1. The pilot feature 224 defines a second through-hole 228. The body 214 of the retainer 210 also defines a lubrication hole 244 that is in fluid communication with the second through-hole 228 of the pilot feature 224. The retainer 210 may be lubricated by directing oil through the lubrication hole 244.

The retainer 210 defines a slot 222 extending from the flange 212 and at least partially towards the second end surface 218 of the body 214 along the central axis A1. The slot 222 is in communication with each of the first through-hole 220 and the second through-hole 228. The slot 222 is partially defined in the flange 212 and partially defined in the body 214.

The retainer 210 further includes a dowel 230 coupled with the body 214. Specifically, the dowel 230 of the retainer 210 is coupled with the body 214 of the retainer 210 by a press fit. The dowel 230 is at least partially disposed in the first through-hole 220. A second portion 232 of the dowel 230 extends axially outwards from the second end surface 218 of the body 214. The second portion 232 defines a length L2. The length L1 of the first portion 226 of the pilot feature 224 is lesser than the length L2 of the second portion 232 of the dowel 230. The dowel 230 defines a third through-hole 234 that is in alignment with the first through-hole 220 of the body 214. Further, diameters D1 (see FIG. 6) of each of the first through-hole 220 and the third through-hole 234 is same. Further, a diameter D2 of the second through-hole 228 is different from the diameters D1 of the first through-hole 220 and the third through-hole 234. Specifically, the diameter D2 is greater than the diameters D1. In some examples, the dowel 230 may be made of a steel or a steel alloy.

The retainer 210 allows removable coupling of the flywheel housing 202 of the power take-off assembly 200 with the number of gears 236, 238, 240 associated with the power take-off assembly 200. The retainer 210 is disposed in a required orientation O1 relative to the flywheel housing 202 using the dowel 230 of the retainer 210 and the identification mark 242. The required orientation O1 is hereinafter interchangeably referred to as a first required orientation O1. The required orientation O1 is variable based on the number of teeth associated with the gear 236, 238, 240 (see FIG. 2), from the number of gears 236, 238, 240, that is to be removably coupled with the flywheel housing 202.

Further, the retainer may also be disposed in a required orientation O2 (shown in FIG. 7) relative to the flywheel housing 202 using the dowel 230 of the retainer 210 and the identification mark 242. The first required orientation O1 and the second required orientation O2 is based on the gear ratio of the power take-off assembly 200. For example, when the required gear ratio is 1:1, the retainer 210 is disposed in the first required orientation O1, whereas, when the required gear ratio is 1.26:1, the retainer 210 is disposed in the second required orientation O2. The required orientation O2 will be explained in relation to FIG. 7. The required orientation O2 is hereinafter interchangeably referred to as a second required orientation O2. The required orientation O1 and the required orientation O2 is explained in relation to the gear 240 herein.

Figure 6:
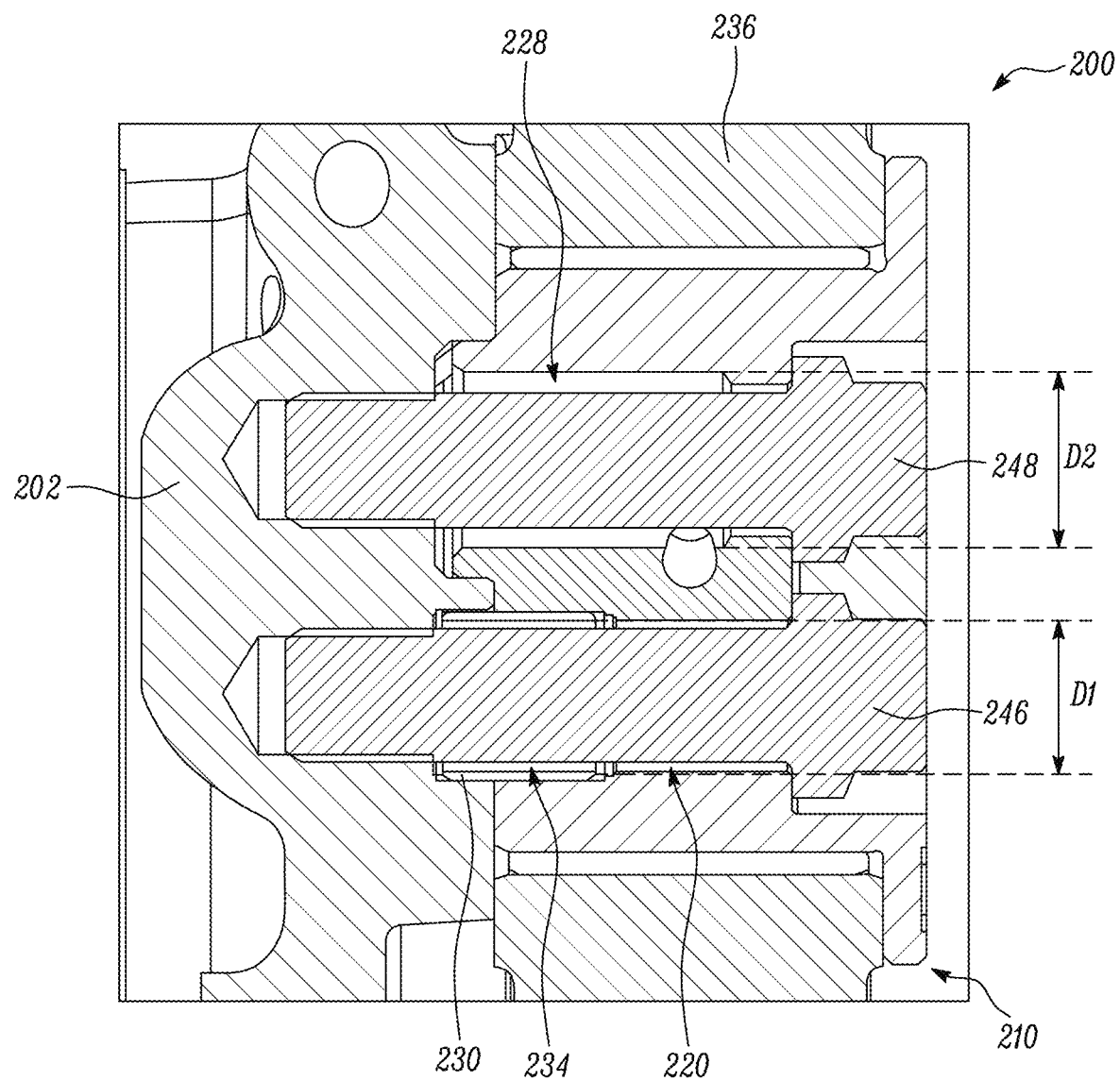
FIG. 6 is a schematic cross-sectional side view of a portion of the power take-off assembly of FIG. 2.

Referring to FIG. 6, a schematic cross-sectional view of a portion of the power take-off assembly 200 is illustrated. The power take-off assembly 200 includes the gear 240 removably coupled with the flywheel housing 202 via the retainer 210. Although gear 240 is illustrated in FIG. 6, the details provided herein are equally applicable for the gear 236, 238. The pilot feature 224 of the body 214 engages with the flywheel housing 202 via an interference fit. Specifically, the first portion 226 of the pilot feature 224 engages with the flywheel housing 202 via the interference fit. Further, the dowel 230 of the retainer 210 engages with the flywheel housing 202 via a slip fit. Specifically, the second portion 232 of the dowel 230 engages with the flywheel housing 202 via the slip fit.

The power take-off assembly 200 also includes a first fastener 246 receivable within the first through-hole 220 of the body 214 and the third through-hole 234 of the dowel 230 to removably couple the retainer 210 with the flywheel housing 202. The power take-off assembly 200 further includes a second fastener 248 receivable within the second through-hole 228 of the pilot feature 224 to removably couple the retainer 210 with the flywheel housing 202. In some examples, each of the first fastener 246 and the second fastener 248 includes a bolt. The first and second fasteners 246, 248 are identical to each other.

With reference to FIGS. 2 to 6, the first opening 204 of the flywheel housing 202 aligns with the first through-hole 220 of the body 214 of the retainer 210 when the retainer 210 is in the first required orientation O1. Further, the second opening 206 of the flywheel housing 202 aligns with the first through-hole 220 of the body 214 of the retainer 210 when the retainer 210 is in the second required orientation O2 (see FIG. 7). Furthermore, the third opening 208 of the flywheel housing 202 aligns with the second through-hole 228 of the body 214 of the retainer 210 when the retainer 210 is in any one of the first required orientation O1 and the second required orientation O2.

Specifically, in FIG. 2, the retainer 210 associated with the gear 240 is shown in the first required orientation O1, thus in order to removably couple the gear 240 with the flywheel housing 202, the first opening 204 of the flywheel housing 202 aligns with the first through-hole 220 of the body 214 of the retainer 210 and the third opening 208 of the flywheel housing 202 aligns with the second through-hole 228 of the body 214 of the retainer 210. Further, as shown in FIG. 2, the identification mark 242 is disposed in a third quadrant that provides a confirmation that the retainer 210 is disposed in the first required orientation O1.

Furthermore, for coupling the gear 236 with the flywheel housing 202, the openings (not shown herein but similar to the second and third openings 206, 208) that are provided on a cover associated with the flywheel housing 202 align with the first through-hole 220 and the second through-hole 228, based on a required orientation of the retainer 210.

Moreover, for coupling the gear 238 with the flywheel housing 202, the fourth opening 254 of the flywheel housing 202 aligns with the first through-hole 220 of the body 214 of the retainer 210 and the fifth opening 256 of the flywheel housing 202 aligns with the second through-hole 228 of the body 214 of the retainer 210.

Figure 7:
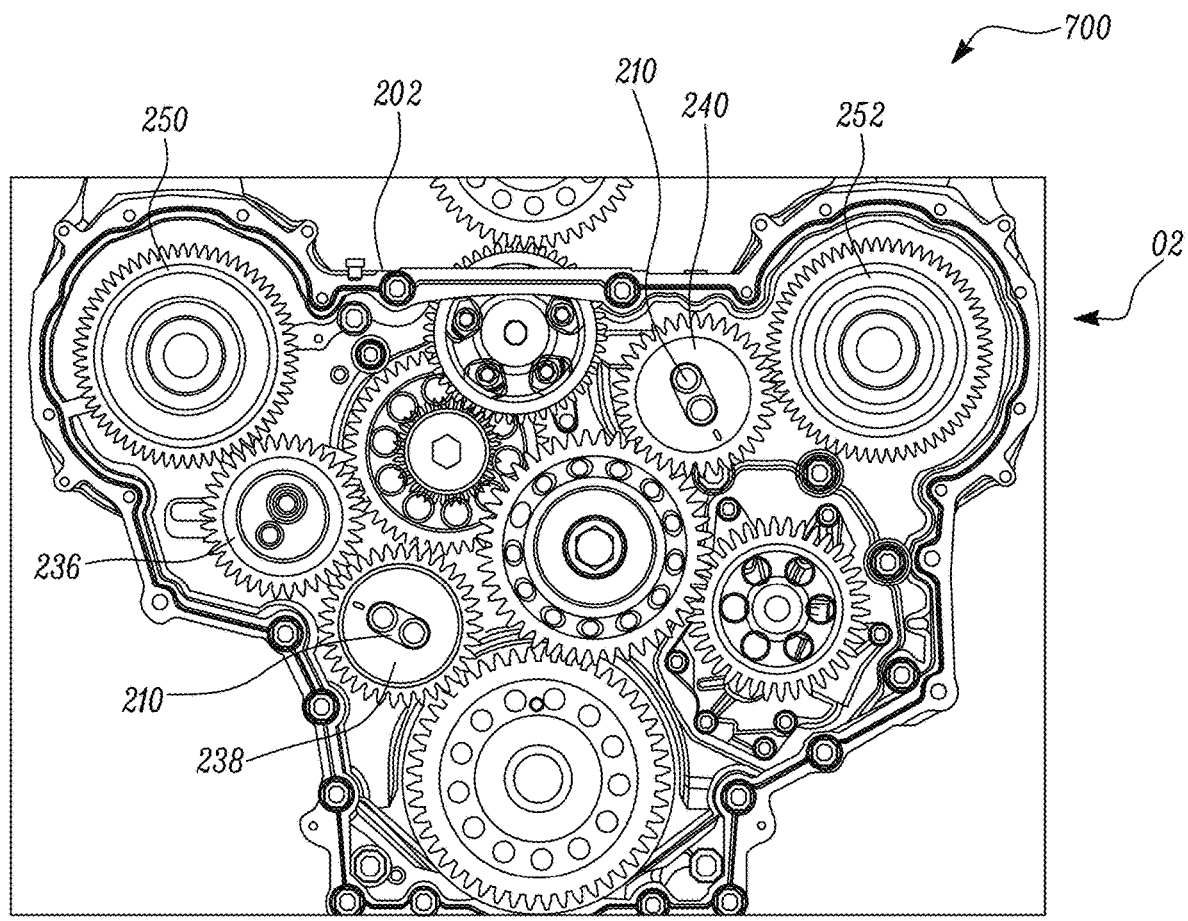
FIG. 7 is a schematic front view of a power take-off assembly, according to another example of the present disclosure.

Referring to FIG. 7, a schematic view of a power take-off assembly 700 is illustrated. The power take-off assembly 700 is substantially similar to the power take-off assembly 200 of FIG. 2, with common components being referred to by the same numerals. However, in FIG. 7, the gear 236 has 37 teeth, the gear 238 has 35 teeth, and the gear 240 has 35 teeth. The power take-off assembly 700 provides a gear ratio of 1.26:1. Further, the retainer 210 is shown in the second required orientation O2. In order to removably couple the gear 240 with the flywheel housing 202, the second opening 206 (see FIG. 3) of the flywheel housing 202 aligns with the first through-hole 220 (see FIG. 5) of the body 214 (see FIG. 4) of the retainer 210 and the third opening 208 (see FIG. 3) of the flywheel housing 202 aligns with the second through-hole 228 (see FIG. 4) of the body 214 of the retainer 210. Further, as shown in FIG. 7, the identification mark 242 is disposed in a fourth quadrant that provides a confirmation that the retainer 210 is disposed in the second required orientation O2.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the retainer 210 for the power take-off assembly 200. The retainer 210 may efficiently sustain gear loads through the first and second fasteners 246, 248, thereby increasing a service life of components, such as the first and second fasteners 246, 248, of the power take-off assembly 200. The retainer 210 may demonstrate adequate fatigue factor and slippage factor, and the retainer 210 may prevent slippage and failure of the fasteners 246, 248 that is otherwise cause due to the gear load. Furthermore, the single flywheel housing 202 may be used for two different gear ratios.

The retainer 210 includes the pilot feature 224 that engages with the flywheel housing 202 via the interference fit. The pilot feature 224 may improve a shear capability of a joint between the retainer 210 and the flywheel housing 202. Further, the pilot feature 224 extends at least partially through the body 214 and is radially offset from the central axis A1 of the retainer 210. The pilot feature 224 is in fluid communication with the lubrication hole 244, thus the pilot feature 224 may serve as a conduit for collecting oil from the lubrication hole 244, thereby ensuring efficient lubrication to the retainer 210 and/or the power take-off assembly 200. In other words, the pilot feature 224 may eliminate a need for drilling multiple oil holes to lubricate the retainer 210 and/or the power take-off assembly 200.

The retainer 210 also includes the dowel 230 defining the third through-hole 234 that may allow correct orienting and assembly of the retainer 210 based on the required gear ratio. Further, the retainer 210 includes the identification mark 242 that may allow the user to correctly orient the retainer 210, based on the required gear ratio, thus eliminating need of high operator skills to couple the gears 236, 238, 240 with the flywheel housing 202. Further, the length L2 of the second portion 232 of the dowel 230 being greater than the length L1 of the first portion 226 of the pilot feature 224 also contributes to orient the retainer 210 in the required orientation O1, O2 during the assembling of the power take-off assembly 200.

The retainer 210 of the present disclosure can be used for two different gear ratios i.e., 1:1 gear ratio and 1.26:1 gear ratio, thereby reducing the number of components and cost associated with the power-take off assembly 200. The retainer 210 may be used to provide two different gear ratios without increasing gear size or gear weight. The retainer 210 is simple in construction and includes only two fasteners 246, 248 to removably couple the corresponding gear 236, 238, 240 with the flywheel housing 202. Further, the diameter D1 of the second through-hole 228 is same for both gear ratios, due to which same bearing may be used for both gear ratios, thereby reducing part numbers.

Overall, the retainer 210 may reduce the number of components, part numbers, simplify the assembly process, reduce assembly as well as maintenance costs, and improve an efficiency of the power take-off assembly 200. Further, the retainer 210 described herein has a compact design.

Figure 8:
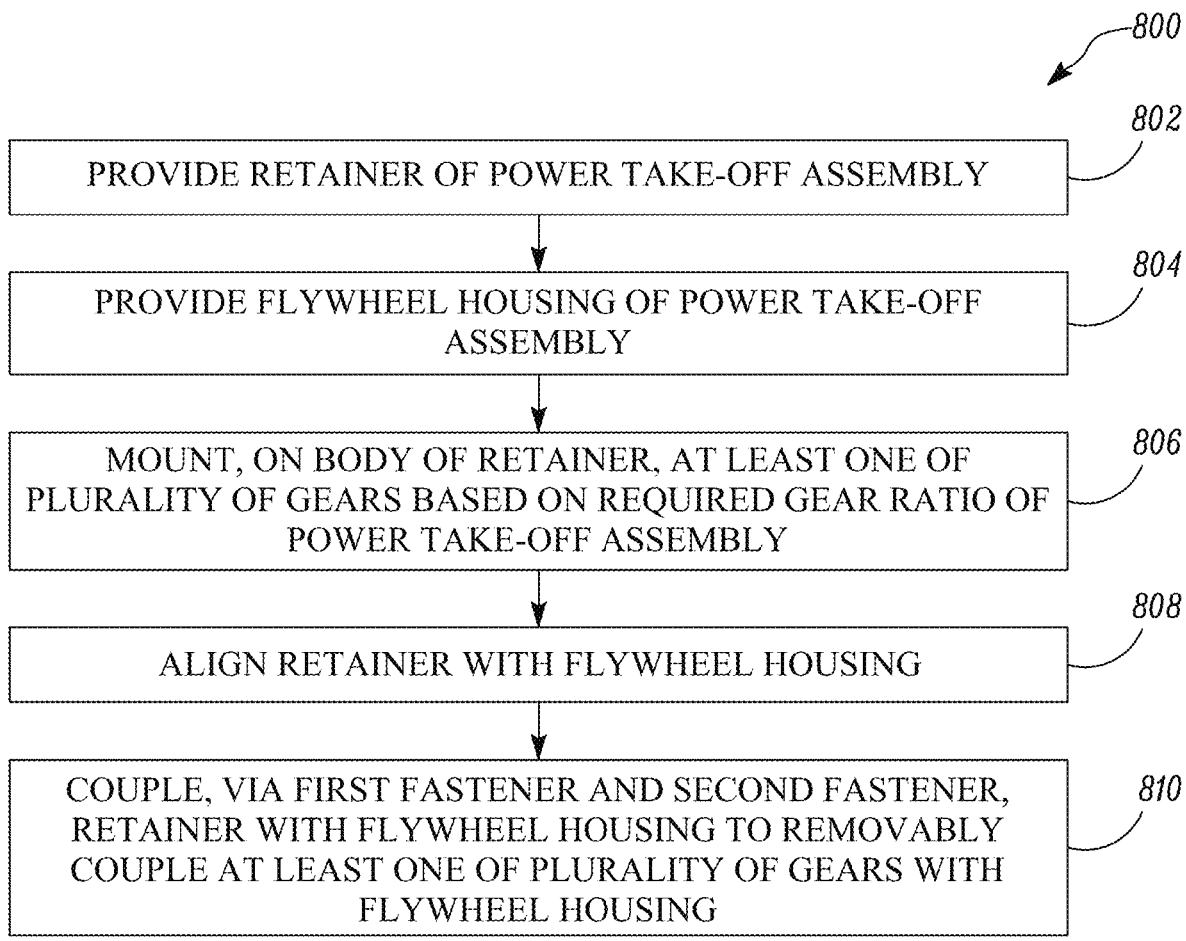
FIG. 8 is a flowchart for a method of assembling the power take-off assembly, according to an example of the present disclosure.

FIG. 8 is a flowchart for a method 800 of assembling the power take-off assembly 200. At step 802, the retainer 210 of the power take-off assembly 200 is provided. The retainer 210 includes the flange 212. The flange 212 includes the identification mark 242. The retainer 210 also includes the body 214 axially extending from the flange 212 along the central axis A1 of the retainer 210. The body 214 defines the first end surface 216 fixedly coupled with the flange 212, the second end surface 218 opposite the first end surface 216, and the first through-hole 220 extending at least partially through the body 214 and radially offset from the central axis A1 of the retainer 210. The body 214 includes the pilot feature 224 extending at least partially through the body 214 and radially offset from the central axis A1 of the retainer 210. The first portion 226 of the pilot feature 224 extends axially outwards from the second end surface 218 of the body 214. The pilot feature 224 defines the second through-hole 228. The retainer 210 further includes the dowel 230 coupled with the body 214. The dowel 230 is at least partially disposed in the first through-hole 220. The second portion 232 of the dowel 230 extends axially outwards from the second end surface 218 of the body 214. The dowel 230 defines the third through-hole 234 that is in alignment with the first through-hole 220 of the body 214.

At step 804, the flywheel housing 202 of the power take-off assembly 200 is provided.

At step 806, one or more of the number of gears 236, 238, 240 is mounted on the body 214 of the retainer 210, based on the required gear ratio of the power take-off assembly 200. The number of gears 236, 238, 240 have different number of teeth.

At step 808, the retainer 210 is aligned with the flywheel housing 202. The step 808 of aligning the retainer 210 with the flywheel housing 202 further includes disposing the retainer 210 in the required orientation O1, O2 relative to the flywheel housing 202 using the dowel 230 of the retainer 210 and the identification mark 242. The required orientation O1, O2 is variable based on the number of teeth associated with the gear 236, 238, 240, from the number of gears 236, 238, 240, that is removably coupled with the flywheel housing 202.

At step 810, the retainer 210 is coupled with the flywheel housing 202 via the first fastener 246 and the second fastener 248 to removably couple one or more of the number of gears 236, 238, 240 with the flywheel housing 202.

The method 800 also includes engaging the pilot feature 224 of the body 214 with the flywheel housing 202 via the interference fit.

The method 800 further includes engaging the dowel 230 of the retainer 210 with the flywheel housing 202 via the slip fit.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A retainer for a power take-off assembly, the retainer comprising:
    a flange;
    a body axially extending from the flange along a central axis of the retainer, wherein the body defines a first end surface fixedly coupled with the flange, a second end surface opposite the first end surface, and a first through-hole extending at least partially through the body and radially offset from the central axis of the retainer, wherein the body includes a pilot feature extending at least partially through the body and radially offset from the central axis of the retainer, wherein a first portion of the pilot feature extends axially outwards from the second end surface of the body, and wherein the pilot feature defines a second through-hole; and
    a dowel coupled with the body, wherein the dowel is at least partially disposed in the first through-hole, wherein a second portion of the dowel extends axially outwards from the second end surface of the body, wherein the dowel defines a third through-hole that is in alignment with the first through-hole of the body, wherein the retainer allows removable coupling of a flywheel housing of the power take-off assembly with a plurality of gears associated with the power take-off assembly, and wherein the plurality of gears have different number of teeth to achieve different gear ratios.

2. The retainer of claim 1, wherein the pilot feature of the body is adapted to engage with the flywheel housing via an interference fit.

3. The retainer of claim 1, wherein the dowel of the retainer is adapted to engage with the flywheel housing via a slip fit.

4. The retainer of claim 1, wherein a length of the first portion of the pilot feature is lesser than a length of the second portion of the dowel.

5. The retainer of claim 1, wherein the flange includes an identification mark, wherein the retainer is disposed in a required orientation relative to the flywheel housing using the dowel of the retainer and the identification mark, and wherein the required orientation is variable based on a number of teeth associated with a gear, from the plurality of gears, that is to be removably coupled with the flywheel housing.

6. The retainer of claim 1, wherein the body of the retainer defines a lubrication hole that is in fluid communication with the second through-hole of the pilot feature.

7. The retainer of claim 1, wherein the dowel of the retainer is coupled with the body of the retainer by a press fit.

8. A power take-off assembly comprising:
    a flywheel housing;
    a retainer adapted to be removable coupled with the flywheel housing, the retainer including:
        a flange;
        a body axially extending from the flange along a central axis of the retainer, wherein the body defines a first end surface fixedly coupled with the flange, a second end surface opposite the first end surface, and a first through-hole extending at least partially through the body and radially offset from the central axis of the retainer, wherein the body includes a pilot feature extending at least partially through the body and radially offset from the central axis of the retainer, wherein a first portion of the pilot feature extends axially outwards from the second end surface of the body, and wherein the pilot feature defines a second through-hole; and
        a dowel coupled with the body, wherein the dowel is at least partially disposed in the first through-hole, wherein a second portion of the dowel extends axially outwards from the second end surface of the body, and wherein the dowel defines a third through-hole that is in alignment with the first through-hole of the body;
    a gear removably coupled with the flywheel housing via the retainer;
    a first fastener receivable within the first through-hole of the body and the third through-hole of the dowel to removably couple the retainer with the flywheel housing; and
    a second fastener receivable within the second through-hole of the pilot feature to removably couple the retainer with the flywheel housing.

9. The power take-off assembly of claim 8, wherein the pilot feature of the body is adapted to engage with the flywheel housing via an interference fit.

10. The power take-off assembly of claim 8, wherein the dowel of the retainer is adapted to engage with the flywheel housing via a slip fit.

11. The power take-off assembly of claim 8, wherein a length of the first portion of the pilot feature is lesser than a length of the second portion of the dowel.

12. The power take-off assembly of claim 8, wherein the flange includes an identification mark, wherein the retainer is disposed in a required orientation relative to the flywheel housing using the dowel of the retainer and the identification mark, and wherein the required orientation is variable based on a number of teeth associated with the gear that is removably coupled with the flywheel housing.

13. The power take-off assembly of claim 8, wherein the body of the retainer defines a lubrication hole that is in fluid communication with the second through-hole of the pilot feature.

14. The power take-off assembly of claim 8, wherein a number of teeth associated with the gear depends on a required gear ratio of the power take-off assembly.

15. The power take-off assembly of claim 8, wherein the flywheel housing defines a first opening adapted to align with the first through-hole of the body of the retainer when the retainer is in a first required orientation, wherein the flywheel housing defines a second opening adapted to align with the first through-hole of the body of the retainer when the retainer is in a second required orientation, wherein the flywheel housing defines a third opening adapted to align with the second through-hole of the body of the retainer when the retainer is in any one of the first required orientation and the second required orientation, and wherein the first required orientation and the second required orientation is based on a required gear ratio of the power take-off assembly.

16. The power take-off assembly of claim 8, wherein the dowel of the retainer is coupled with the body of the retainer by a press fit.

17. A method of assembling a power take-off assembly, the method comprising:
provinding a retainer of the power take-off assembly, the retainer
including:
a flange;
a body axially extending from the flange along a central axis of the retainer, wherein the body defines a first end surface fixedly coupled with the flange, a second end surface opposite the first end surface, and a first through-hole extending at least partially through the body and radially offset from the central axis of the retainer, wherein the body includes a pilot feature extending at least partially through the body and radially offset from the central axis of the retainer, wherein a first portion of the pilot feature extends axially outwards from the second end surface of the body, and wherein the pilot feature defines a second through-hole; and
a dowel coupled with the body, wherein the dowel is at least partially disposed in the first through-hole, wherein a second portion of the dowel extends axially outwards from the second end surface of the body, and wherein the dowel defines a third through-hole that is in alignment with the first through-hole of the body;
providing a flywheel housing of the power take-off assembly;
mounting, on the body of the retainer, at least one of a plurality of gears based on a required gear ratio of the power take-off assembly, wherein the plurality of gears have different number of teeth;
aligning the retainer with the flywheel housing; and
coupling, via a first fastener and a second fastener, the retainer with the flywheel housing to removably couple at least one of the plurality of gears with the flywheel housing.

18. The method of claim 17 further comprising engaging the pilot feature of the body with the flywheel housing via an interference fit.

19. The method of claim 17 further comprising engaging the dowel of the retainer with the flywheel housing via a slip fit.

20. The method of claim 17, wherein the flange includes an identification mark, wherein the step of aligning the retainer with the flywheel housing further includes disposing the retainer in a required orientation relative to the flywheel housing using the dowel of the retainer and the identification mark, and wherein the required orientation is variable based on a number of teeth associated with a gear, from the plurality of gears, that is removably coupled with the flywheel housing.

* * * * *